(12) United States Patent
Li

(10) Patent No.: US 9,884,640 B2
(45) Date of Patent: Feb. 6, 2018

(54) FOLDABLE STROLLER

(71) Applicant: Wonderland Nurserygoods Company Limited, N.T. (HK)

(72) Inventor: Jian-Qun Li, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 9 days.

(21) Appl. No.: 15/134,391

(22) Filed: Apr. 21, 2016

(65) Prior Publication Data

US 2016/0311455 A1 Oct. 27, 2016

(30) Foreign Application Priority Data

Apr. 23, 2015 (CN) .......................... 2015 1 0198256

(51) Int. Cl.
*B62B 7/08* (2006.01)
*B62B 7/14* (2006.01)
*B62B 7/06* (2006.01)

(52) U.S. Cl.
CPC ................ *B62B 7/08* (2013.01); *B62B 7/064* (2013.01); *B62B 7/142* (2013.01); *B62B 7/145* (2013.01); *B62B 7/147* (2013.01); *B62B 2205/24* (2013.01)

(58) Field of Classification Search
None
See application file for complete search history.

(56) References Cited

U.S. PATENT DOCUMENTS

| | | | |
|---|---|---|---|
| 5,364,119 A * | 11/1994 | Leu | B62B 7/06 280/647 |
| 6,948,197 B1 | 9/2005 | Chen | |
| 8,276,935 B2 * | 10/2012 | Minato | B62B 7/062 280/47.38 |
| 2005/0194218 A1 * | 9/2005 | D'Arca | B62B 3/1404 188/19 |
| 2009/0278335 A1 * | 11/2009 | Dotsey | B62B 7/10 280/647 |
| 2015/0054239 A1 * | 2/2015 | Stewart | B62B 3/022 280/38 |

(Continued)

FOREIGN PATENT DOCUMENTS

| | | |
|---|---|---|
| CN | 101837797 B | 2/2014 |
| CN | 203854700 U | 10/2014 |
| CN | 205186247 U | 4/2016 |

(Continued)

*Primary Examiner* — John D Walters
*Assistant Examiner* — Hilary L Johns
(74) *Attorney, Agent, or Firm* — Winston Hsu

(57) ABSTRACT

A foldable stroller includes a frame and a locking component. The frame includes a handle, a front foot, a rear foot, and a carrier support. An upper end of the front foot is pivoted to the handle. An upper end of the rear foot is pivoted to the handle. The carrier support includes at least one connecting rod. An end of the at least one connecting rod is pivoted to the front foot, and the other end of the at least one connecting rod is pivoted to the rear foot. The locking component is installed between the rear foot and the handle. The locking component locks rotation of the rear foot relative to the handle when the foldable stroller is unfolded. Due to aforementioned structure, the foldable stroller is not only reliable in operation but also has a smaller occupied space after being folded.

14 Claims, 13 Drawing Sheets

(56) References Cited

U.S. PATENT DOCUMENTS

2015/0217792 A1* 8/2015 Stiba .................. B62B 7/008
                                                         280/650
2016/0001804 A1  1/2016 Pacella

FOREIGN PATENT DOCUMENTS

| DE | 20 2012 100 005 U1 | 4/2012 |
| DE | 10 2016 200 811 A1 | 7/2016 |
| GB | 2 446 806 A | 8/2008 |
| WO | 2014044737 A1 | 3/2014 |

* cited by examiner

FOLDABLE STROLLER

BACKGROUND OF THE INVENTION

1. Field of the Invention

The present invention relates to a stroller, and more particularly, to a foldable stroller.

2. Description of the Prior Art

Strollers are vehicles designed for carrying infants or babies. A stroller is usually provided with foldable structure for easy transportation and storage. For example, in China Patent Application CN201010185251.3, a conventional stroller includes two handles, two front supports, two rear supports, and a bottom support connected to the two front supports and the two rear supports. The two handles are connected to two upper ends of the two front supports respectively. Two front ends of the two rear supports are pivoted to two middle portions of the two front supports respectively. In such a way, the two rear supports can rotate toward the two front supports to fold the stroller. However, since the two handles are connected to the two front supports and cannot rotate relative to the two front supports, an overall length of the folded stroller is the sum of a length of the handle and a length of the front support. As a result, the folded stroller needs a larger space for transportation or storage. Besides, when it is desired to install a seat on the stroller, the seat is usually installed at two joints of the two front supports and the two rear supports. As a result, the two rear supports may be easily stretched rearward to deform, or turn over easily due to excessive length of two upper portions of the two front supports, which is not reliable in operation.

Therefore, there is a need to design a stroller which has advantages of a compact folded size and reliable operation.

SUMMARY OF THE INVENTION

The present invention is to provide a stroller which has advantages of a compact folded size and reliable operation.

According to the claimed invention, a foldable stroller is disclosed. The foldable stroller includes a frame and a locking component. The frame includes a handle, a front foot, a rear foot, and a carrier support. An upper end of the front foot is pivoted to the handle. An upper end of the rear foot is pivoted to the handle. The carrier support includes at least one connecting rod. An end of the at least one connecting rod is pivoted to the front foot, and the other end of the at least one connecting rod is pivoted to the rear foot. The locking component is installed between the rear foot and the handle. The locking component locks rotation of the rear foot relative to the handle when the frame is unfolded.

Preferably, the foldable stroller further includes a seat. The frame further includes a fixing base installed on the front foot. The seat is installed on the fixing base forwardly or rearwardly, and the seat is foldable along with the frame when the foldable stroller is folded.

Specifically, the fixing base is rotatably installed on the front foot. The frame further includes an engaging assembly for locking rotation of the fixing base relative to the front foot, and when the seat is installed on the fixing base rearwardly and the foldable stroller is folded, the engaging assembly is operated to release the fixing base and the front foot, so that the seat is rotatably folded along with the frame.

More specifically, a positioning hole is formed on the fixing base, and the engaging assembly includes a fixing component and a protruding block. The fixing component is fixed on the front foot. The protruding block is disposed on the fixing component. The fixing base is not rotatable relative to the front foot when the protruding block engages with the positioning hole.

More specifically, the engaging assembly further includes an installing plate disposed on a lower end of the fixing base. The positioning hole is formed on the installing plate, and the protruding block is a hemispherical block.

Specifically, the fixing base is installed at a joint of the carrier support and the front foot, which is more reliable in operation. Preferably, two ends of the at least one connecting rod of the carrier support are connected to a middle portion of the front foot and an end of the rear foot, respectively.

Preferably, the handle includes a handling portion and two installing rods connected to the handling portion and spaced from each other. The front foot includes two front supporting rods corresponding to the two installing rods and spaced from each other. The rear foot includes two rear supporting rods corresponding to the two installing rods and spaced from each other. An upper end of each of the two front supporting rods is pivoted to an end of the corresponding installing rod, and an upper end of each of the two rear supporting rods is pivoted to a middle portion of the corresponding installing rod.

Specifically, the front foot further includes a front linking rod connected between two lower ends of the two front supporting rods, which improves structural strength of the frame.

Specifically, the carrier support includes two connecting rods spaced from each other. The carrier support further includes a middle linking rod connected between rear ends of the two connecting rods. A front end of each of the two connecting rods is pivoted to a middle portion of the corresponding front supporting rod, and the rear end of each of the two connecting rods is pivoted to a middle portion of the corresponding rear supporting rod. In such a way, when the frame is unfolded, the front foot and the rear foot are restrained by the two connecting rods, so that the rear foot does not stretch rearwardly and deform. Furthermore, the middle linking rod ensures the two front supporting rods and the two rear supporting rods to move simultaneously, which prevents the frame from stretching rearwardly and deforming, too. Besides, there is a space formed between two lateral sides of the frame, which allows users to place the unfolded frame on a car seat easily.

Specifically, two ends of the handling portion are connected to ends of the two installing rods respectively, which improves the structural strength of the frame and allows users to grab the handling portion easily.

Preferably, the locking component includes a circular locking disc, a rotating disc, and a locking gear. The circular locking disc is disposed on the handle. The rotating disc is disposed on the rear foot. The rotating disc is rotatably installed on the handle and opposite to the circular locking disc. The locking gear is installed between the circular locking disc and the rotating disc. Each of the circular locking disc and the rotating disc has an internal gear corresponding to the locking gear. The locking gear engages with both of the two internal gears of the circular locking disc and the rotating disc to lock the rotation of the rear foot relative to the handle, and the locking gear disengages from the internal gear of the rotating disc to release the rotation of the rear foot relative to the handle.

Specifically, the locking component further includes a resilient member and an operating portion. The resilient member abuts between the circular locking disc and the locking gear. The operating portion is installed on an outer surface of the rotating disc. The operating portion includes a plurality of abutting protrusions. A plurality of through holes is formed on the rotating disc for allowing the plurality of abutting protrusions to pass through, and the plurality of abutting protrusions pushes the locking gear to disengage from the internal gear of the rotating disc when the operating portion is pressed.

Specifically, the locking gear includes a plurality of teeth with different sizes or different space widths, and when the frame is unfolded, the plurality of teeth of the locking gear mates with a plurality of teeth of the internal gear of the rotating disc, so that the locking gear is movable between the circular locking disc and the rotating disc. In such a way, the locking gear is driven by the resilient member to engage with both of the two internal gears of the circular locking disc and the rotating disc only when the frame is unfolded.

Preferably, the foldable stroller further includes two front wheels and two rear wheels. The two front wheels are installed on a lower end of the front foot. The two rear wheels are installed on a lower end of the rear foot.

In summary, the present invention utilizes the front foot and the rear foot pivoted to the handle for allowing users to fold the front foot, the rear foot, the carrier support, and the handle together by rotating the handle toward the front foot. As a result, an overall length of the folded foldable stroller is approximately equal to a length of the front foot or the rear foot, which reduces an occupied space of the folded foldable stroller. Besides, the present invention further utilizes the locking component disposed between the handle and the rear foot for allowing users to release the rotation of the rear foot relative to the handle by operating the locking component, which is convenient in use. Moreover, since the rear foot is connected to the handle instead of the front foot, the rear foot supports the handle when the seat is installed on the unfolded frame. Therefore, the unfolded frame is effectively prevented from turning over, which is more reliable in operation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
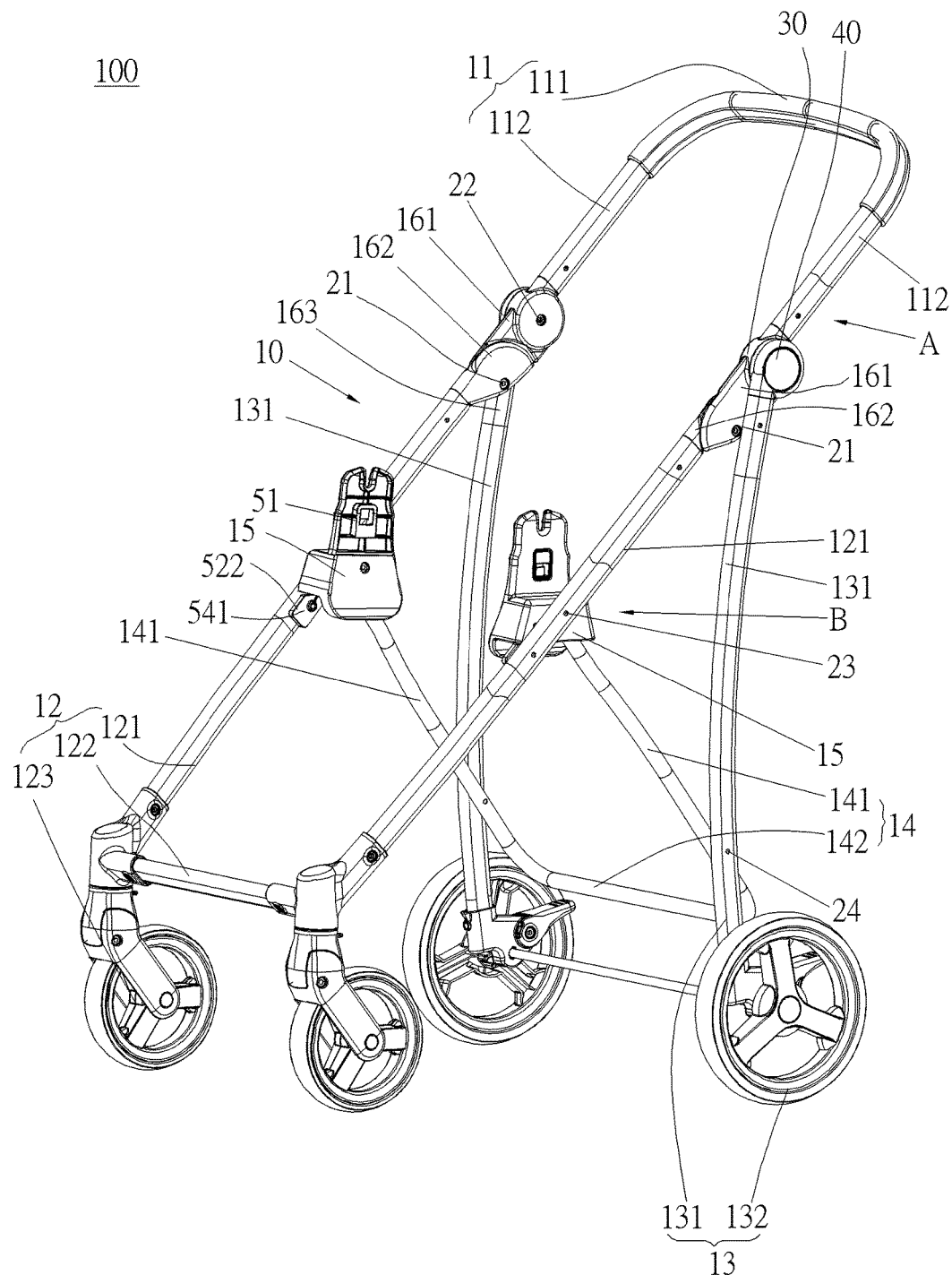
FIG. 1 is a schematic diagram of a frame of a foldable stroller according to an embodiment of the present invention.

Please refer to FIG. 1. FIG. 1 is a schematic diagram of a frame 10 of a foldable stroller 100 according to an embodiment of the present invention. The foldable stroller 100 includes the frame 10 and a locking component 30. The frame 10 includes a handle 11, a front foot 12, a rear foot 13, and a carrier support 14. An upper end of the front foot 12 is pivoted to the handle 11 by two first pivoting shafts 21. An upper end of the rear foot 13 is pivoted to the handle 11 by two second pivoting shafts 22. The carrier support 14 includes two connecting rods 141 spaced from each other. An end of each of the two connecting rods 141 is pivoted to the front foot 12 by a third pivoting shaft 23. The other end of each of the two connecting rods 141 is pivoted to the rear foot 13 by a fourth pivoting shaft 24. The locking component 30 is installed between the rear foot 13 and the handle 11, i.e., the locking component 30 is installed at one of two pivoting joints of the rear foot 13 and the handle 11. However, the foldable stroller 100 also can include two locking component 30 installed at both of the two pivoting joints of the rear foot 13 and the handle 11. As shown in FIG. 1, the locking component 30 locks rotation of the rear foot 13 relative to the handle 11 when the frame 10 is unfolded.

Figure 2:
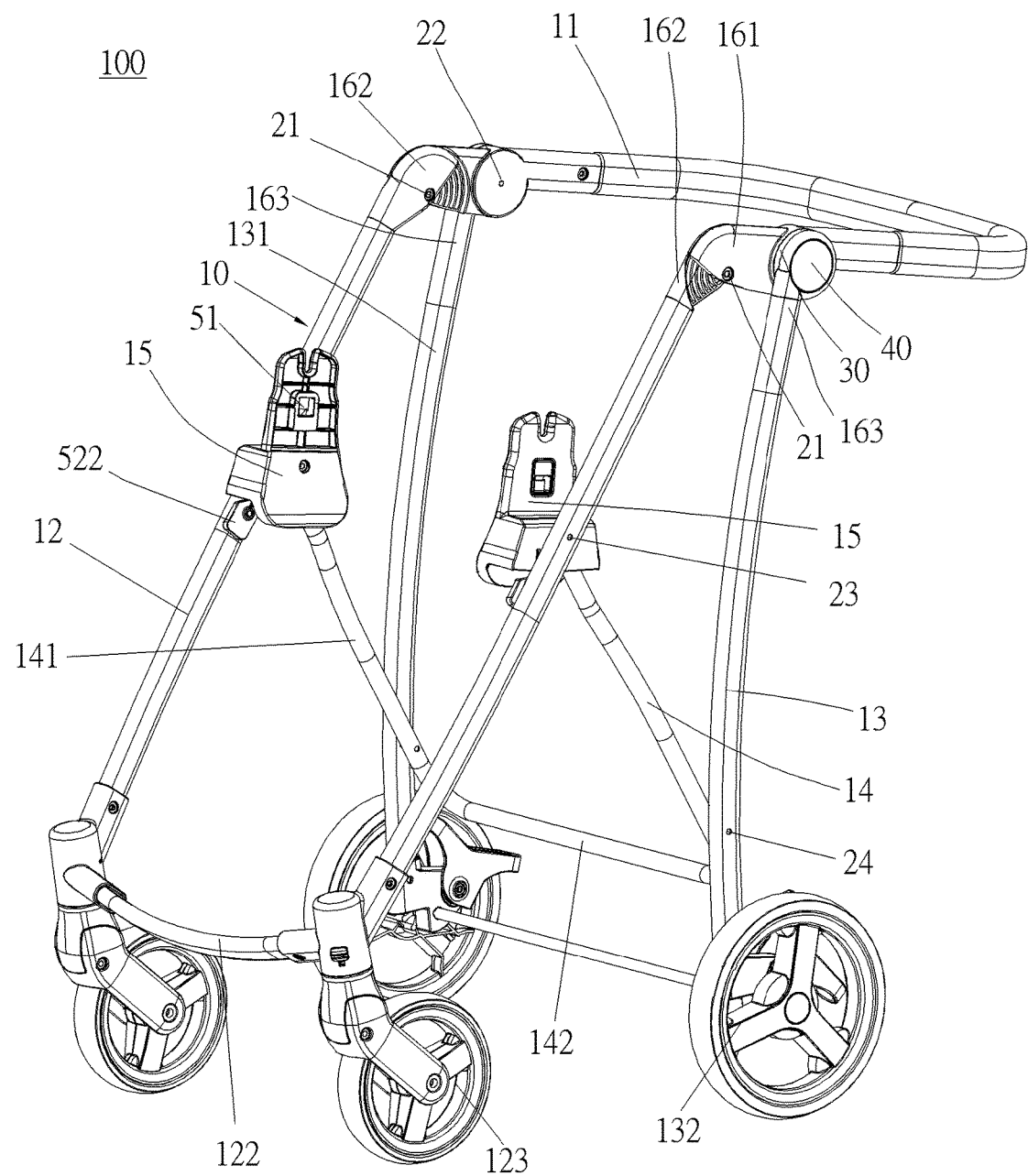
FIG. 2 is a diagram of the frame of the foldable stroller having not been folded completely according to the embodiment of the present invention.
Figure 3:
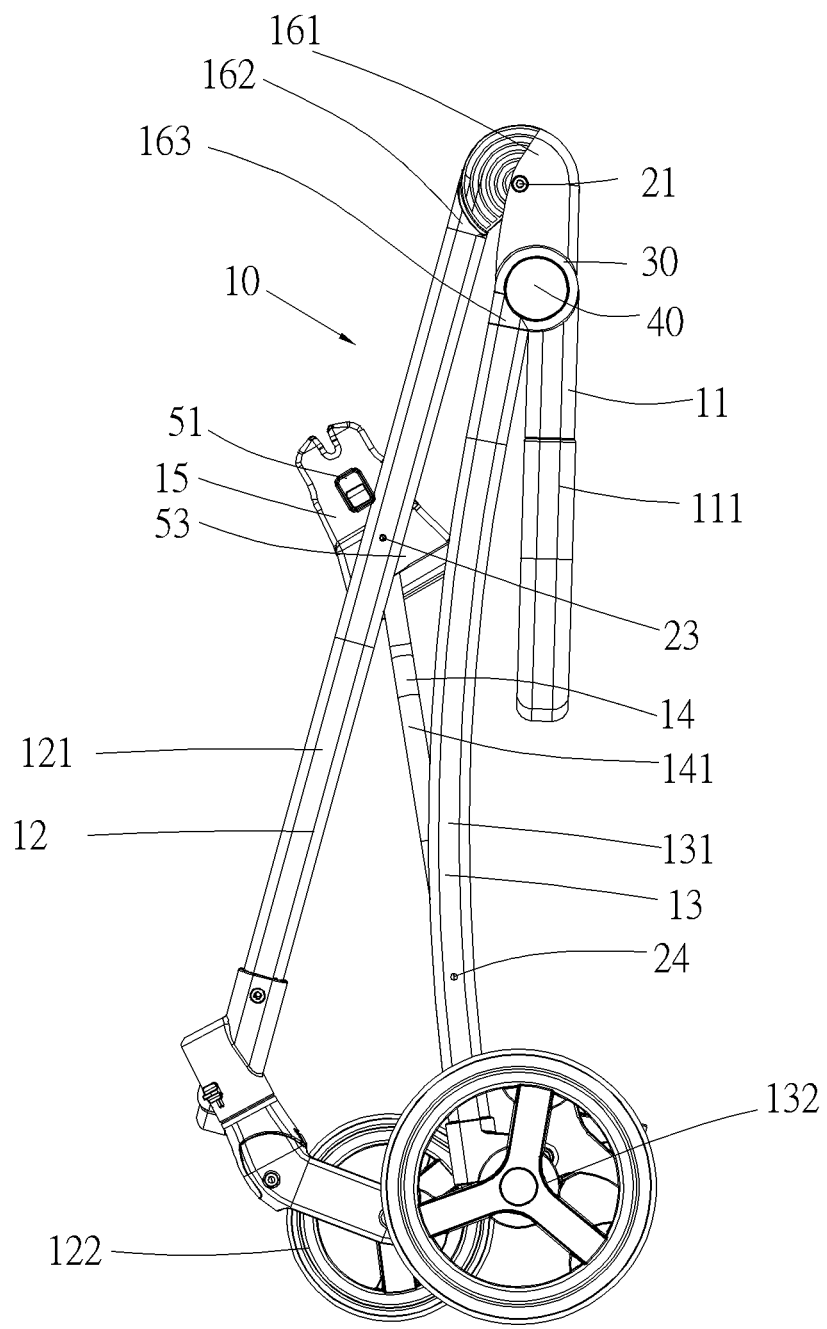
FIG. 3 is a diagram of the frame of the foldable stroller having been folded completely according to the embodiment of the present invention.

Please refer to FIG. 2 and FIG. 3. FIG. 2 is a diagram of the frame 10 of the foldable stroller 100 having not been folded completely according to the embodiment of the present invention. FIG. 3 is a diagram of the frame 10 of the foldable stroller 100 having been folded completely according to the embodiment of the present invention. When it is desired to fold the frame 10, the locking component 30 is operated to release the rotation of the rear foot 13 relative to the handle 11. Afterwards, as shown in FIG. 2, the rear foot 13 moves close to the handle 11 and the front foot 12 when the handle 11 rotates relative to the rear foot 13. Furthermore, the carrier support 14 rotates to be folded at the same time. As shown in FIG. 3, after the front foot 12, the rear foot 13, and the carrier support 14 are folded relative to the handle 11, the frame 10 is folded.

As shown in FIG. 1, the handle 11 includes a handling portion 111 and two installing rods 112 connected to the handling portion 111 and spaced from each other. The front foot 12 includes two front supporting rods 121 corresponding to the two installing rods 112 and spaced from each other. The rear foot 13 includes two rear supporting rods 131 corresponding to the two installing rods 112 and spaced from each other. An upper end of each of the two front supporting rods 121 is pivoted to an end of the corresponding installing rod 112. An upper end of each of the two rear supporting rods 131 is pivoted to a middle portion of the corresponding installing rod 112. In this embodiment, the two installing rods 112 can be substantially parallel to each other, and so are the two front supporting rods 121 and the two rear supporting rods 131. However, the configurations of the installing rods 112, the front supporting rods 121, and the rear supporting rods 131 are not limited to the figures of this embodiment. For example, the two installing rods 112 also can be arranged in a "∧" shape (i.e., two lower ends of the two installing rods 112 extend outward relative to two top ends of the two installing rods 112).

In order to stabilize structure of the frame 10, the handling portion 111 can be preferably a horizontal rod. Two ends of the horizontal rod are connected to the other ends of the two installing rods 112, respectively. Besides, the front foot 12 can further include a front linking rod 122 connected to two lower ends of the two front supporting rods 121. Furthermore, in this embodiment, the upper end of the front foot 12 is located near the upper end of the rear foot 13, i.e., each of the two first pivoting shaft 21 is located near the corresponding second pivoting shaft 22, which makes structure of the folded foldable stroller 100 more compact and makes structure of the unfolded frame 10 more stable.

Specifically, as shown in FIG. 1, the carrier support 14 further includes a middle linking rod 142 connected between two rear ends of the two connecting rods 141. A front end of each of the two connecting rods 141 is pivoted to a middle portion of the corresponding front supporting rod 121. The rear end of each of the two connecting rods 141 is pivoted to a middle portion of the corresponding rear supporting rod 131. More specifically, the rear end of each of the two connecting rods 141 is pivoted to a location near the lower end of the corresponding rear supporting rod 131, and the front end of each of the two connecting rods 141 is pivoted to a location near the middle portion of the corresponding front supporting rod 121.

Specifically, in order to pivotally connect the handle 11 to the front foot 12 and the rear foot 13, the frame 10 can further include two handle connecting components 161, two front connecting components 162, and two rear connecting components 163. The two handle connecting components 161 are disposed on the handle 11. The two front connecting components 162 are disposed on the front foot 12. The two rear connecting components 163 are disposed on the rear foot 13. The two handle connecting components 161 are pivoted to the two front connecting components 162 by the two first pivoting shafts 21, respectively. The two rear connecting components 163 are pivoted to the two handle connecting components 161 by the two second pivoting shafts 22, respectively. The locking component 30 is installed on one of the two rear connecting components 163 and the corresponding handle connecting component 161.

Additionally, as shown in FIG. 1 and FIG. 2, the foldable stroller 100 further includes two front wheels 123 and two rear wheels 132. The two front wheels 123 are installed on a lower end of the front foot 12, and the two rear wheels 132 are installed on a lower end of the rear foot 13.

Figure 4A:
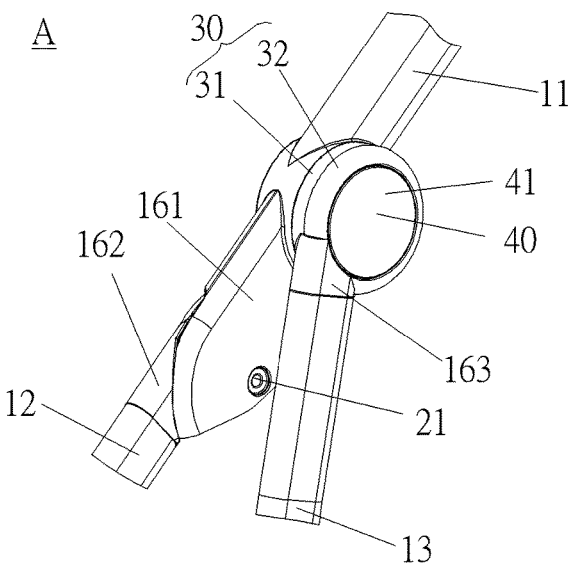
FIG. 4A is an enlarged diagram of an A portion of the frame of the foldable stroller shown in FIG. 1 according to the embodiment of the present invention.
Figure 4B:
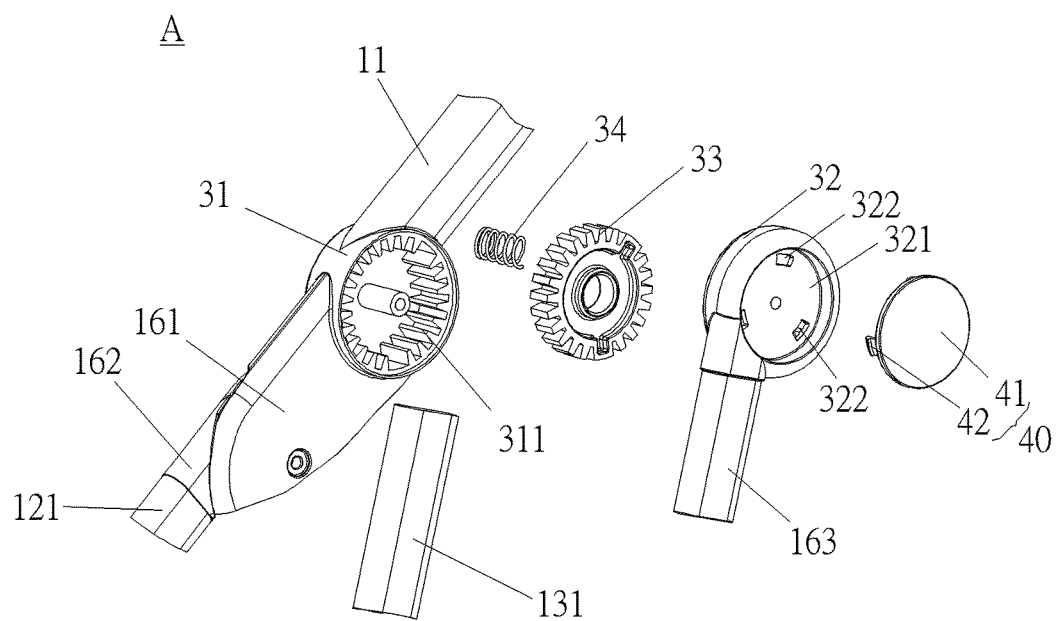
FIG. 4B is an exploded diagram of the A portion of the frame of the foldable stroller shown in FIG. 1 according to the embodiment of the present invention.
Figure 4C:
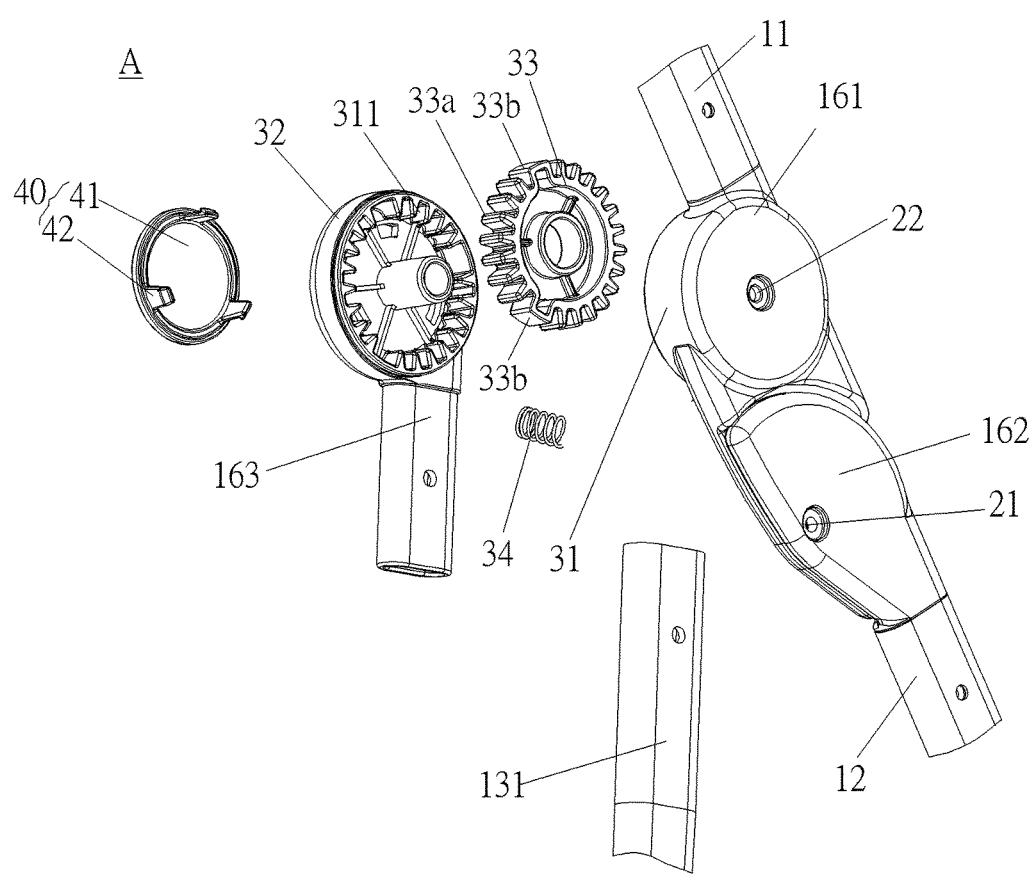
FIG. 4C is another exploded diagram of the A portion of the frame of the foldable stroller shown in FIG. 1 at another view according to the embodiment of the present invention.

Please refer to FIG. 4A to FIG. 4C. FIG. 4A is an enlarged diagram of an A portion of the frame 10 of the foldable stroller 100 shown in FIG. 1 according to the embodiment of the present invention. FIG. 4B is an exploded diagram of the A portion of the frame 10 of the foldable stroller 100 shown in FIG. 1 according to the embodiment of the present invention. FIG. 4C is another exploded diagram of the A portion of the frame 10 of the foldable stroller 100 shown in FIG. 1 at another view according to the embodiment of the present invention. The locking component 30 includes a circular locking disc 31, a rotating disc 32, and a locking gear 33. The circular locking disc 31 is disposed on the handle 11 or the handle connecting component 161. The rotating disc 32 is disposed on the rear foot 13 or the rear connecting component 163. The locking gear 33 is installed between the circular locking disc 31 and the rotating disc 32. Each of the circular locking disc 31 and the rotating disc 32 has an internal gear 311 corresponding to the locking gear 33. The rotating disc 32 is pivoted to the handle 31 and opposite to the circular locking disc 31, and an installing space is formed between the circular locking disc 31 and the rotating disc 32 for installing the locking gear 33. Preferably, the rotating disc 32 can be rotatably sleeved on the circular locking disc 31 in this embodiment. When the rotation of the rear foot 13 relative to the handle 11 is locked, the locking gear 33 is located within the installing space and engages with both of the internal gears 311 of the circular locking disc 31 and the rotating disc 32. On the other hand, the rear foot 13 and the handle 11 are released to rotate relative to each other when the locking gear 33 disengages from the internal gear 311 of the rotating disc 32.

Specifically, as shown in FIG. 4B and FIG. 4C, the locking component 30 further includes a resilient member 34 and an operating portion 40. The resilient member 34 abuts between the circular locking disc 31 and the locking gear 33 for providing a resilient force for pushing the locking gear 33 to move toward the rotating disc 32, so that the locking gear 33 engages with the internal gears 311 of the circular locking disc 31 and the rotating disc 32 at the same time for locking the rotation of the rear foot 13 relative to the handle 11. The operating portion 40 contacts with the locking gear 33. The operating portion 40 is operated to push the locking gear 33 to move toward the circular locking disc 31, so that the locking gear 33 disengages from the internal gear 311 of the rotating disc 32 for allowing the rotation of the rear foot 13 relative to the handle 11. The operation portion 40 is installed on an outer surface of the rotating disc 32. The operation portion 40 includes a pressing plate 41 and a plurality of abutting protrusions 42 protruding from an inner surface of the pressing plate 41. A plurality of through holes 322 is formed on the rotating disc 32 for allowing the plurality of abutting protrusions 42 to pass through. When the operating portion 40 is pressed, the plurality of abutting protrusions 42 is driven to push the locking gear 33 to disengage from the internal gear 311 of the rotating disc 32, so that the rotating disc 32 and the circular locking disc 31 are released to rotate relative to each other. Accordingly, the rotation of the rear foot 13 relative to the handle 11 is allowed.

As shown in FIG. 4A and FIG. 4B, an operating slot 321 is formed on the outer surface of the rotating disc 32. The plurality of through holes 322 is formed on the operating slot 321. The pressing plate 41 is installed in the operating slot 321. Each of the plurality of abutting protrusions 42 includes a resilient arm and a fixing block disposed on an end of the resilient arm. Each of the plurality of abutting protrusions 42 passes through the corresponding through hole 322 and installed on the rotating disc 32 by the fixing block.

As shown in FIG. 4B and FIG. 4C, the locking gear 33 includes a plurality of teeth with different sizes or different space widths. When the frame 10 is unfolded, the plurality of teeth of the locking gear 33 mates with a plurality of teeth of the internal gear 311 of the rotating disc 32, so that the locking gear 33 is movable between the rotating disc 32 and the circular locking disc 31. In this embodiment, the locking gear 33 can include a plurality of first teeth 33a and two second teeth 33b. The second tooth 33b is larger than the first tooth 33a. An angle between central lines of the two second teeth 33b is less than 180 degree. However, structure of the locking component 30 is not limited to this embodiment, and it depends on practical demands.

Figure 5A:
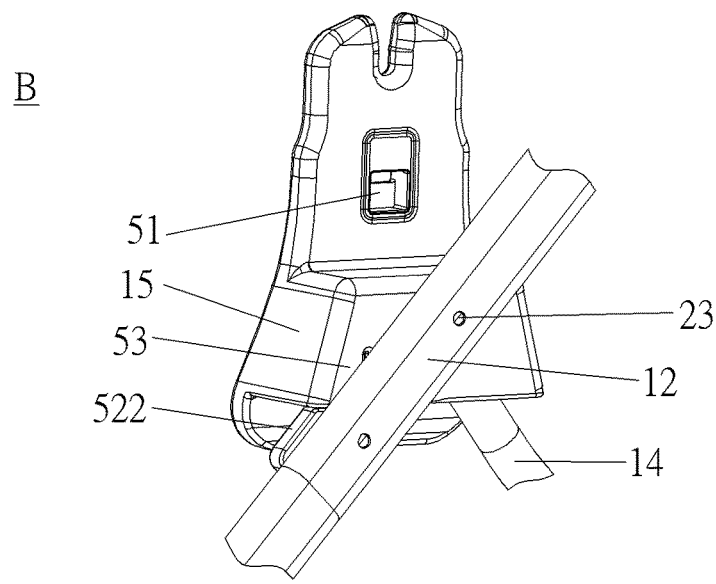
FIG. 5A is an enlarged diagram of a B portion of the frame of the foldable stroller shown in FIG. 1 according to the embodiment of the present invention.
Figure 5B:
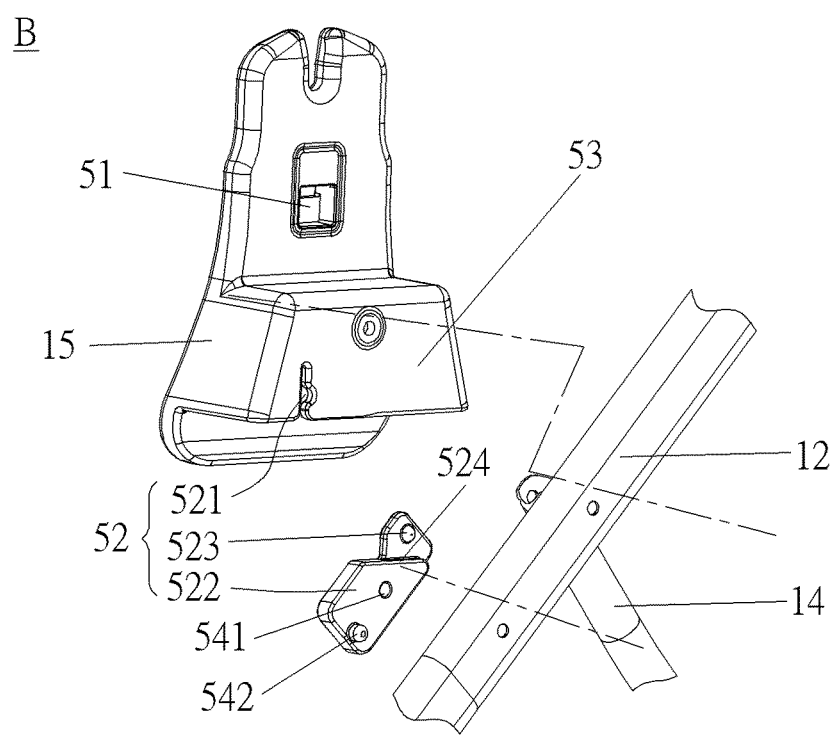
FIG. 5B is an exploded diagram of the B portion of the frame of the foldable stroller shown in FIG. 1 according to the embodiment of the present invention.
Figure 6:
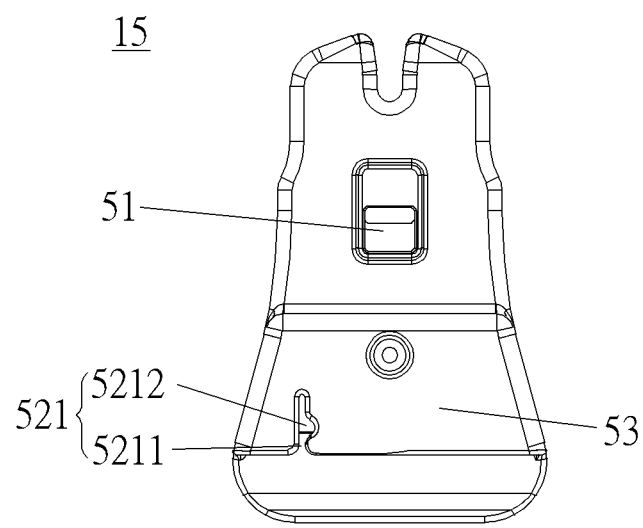
FIG. 6 is a diagram of a fixing base according to the embodiment of the present invention.
Figure 7A:
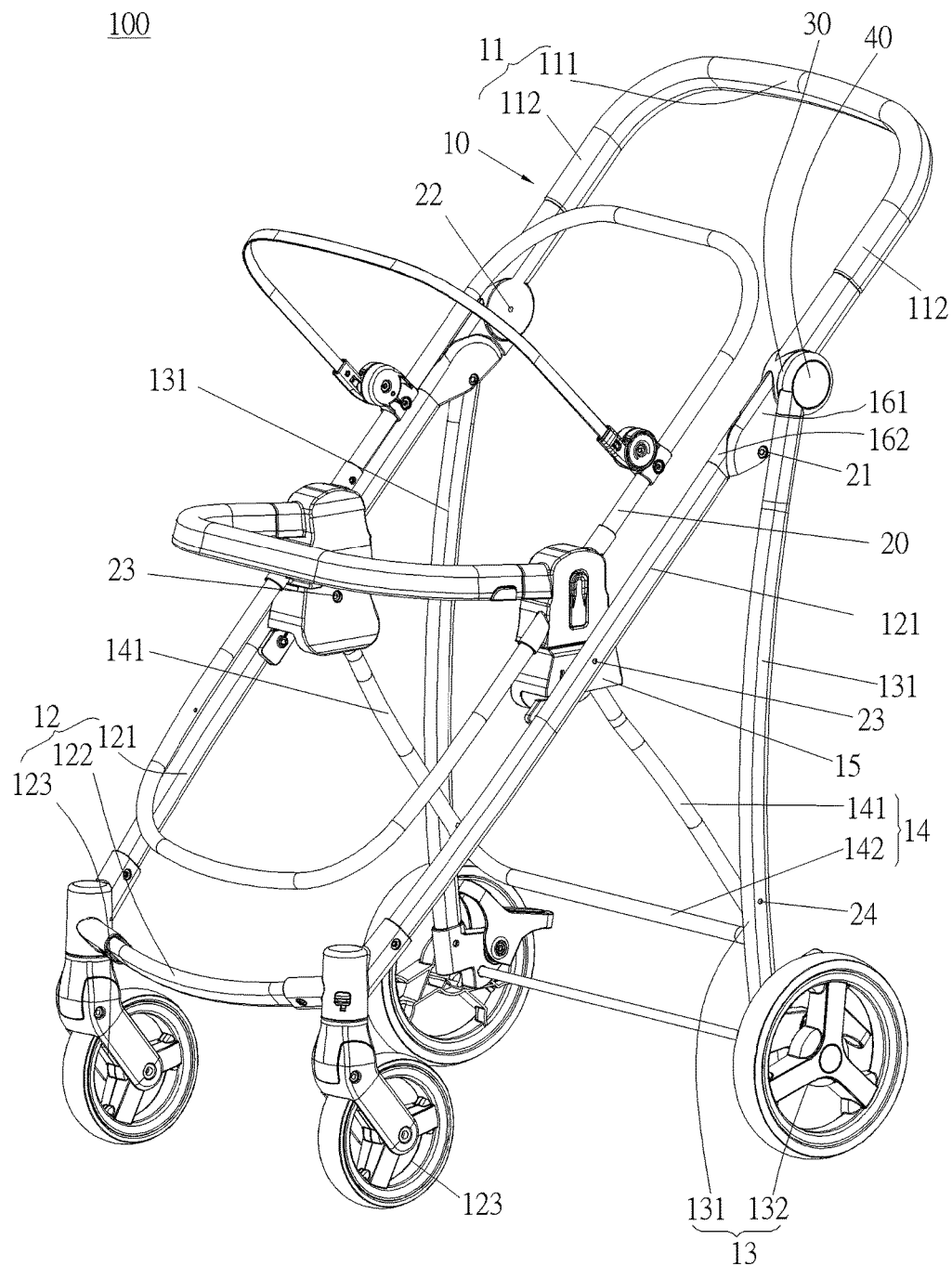
FIG. 7A is a diagram of the foldable stroller with a seat facing forwardly as the frame is unfolded according to the embodiment of the present invention.
Figure 7B:
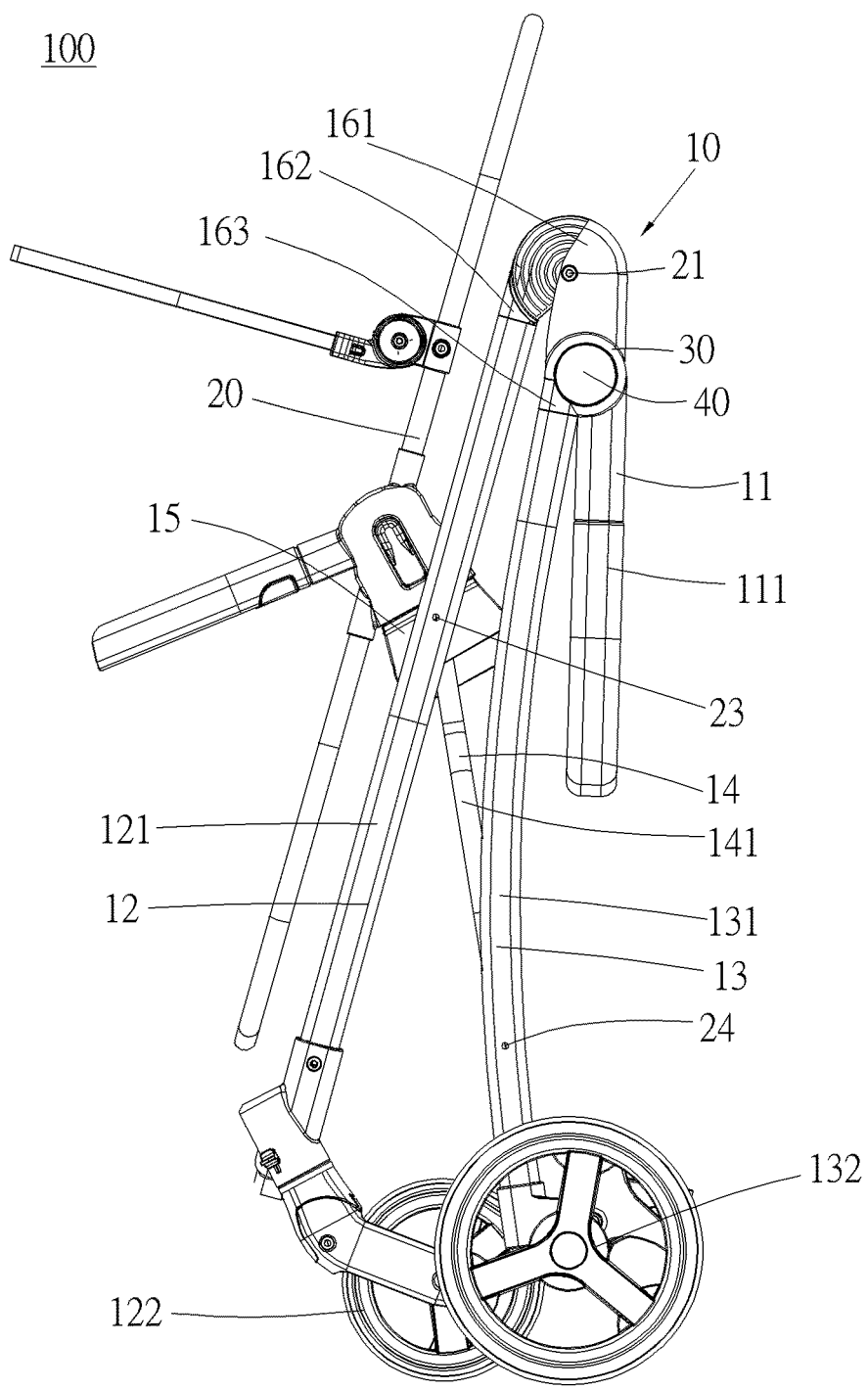
FIG. 7B is a diagram of the foldable stroller with the seat facing forwardly as the frame is folded according to the embodiment of the present invention.

Please refer to FIG. 5A to FIG. 7B. FIG. 5A is an enlarged diagram of a B portion of the frame 10 of the foldable stroller 100 shown in FIG. 1 according to the embodiment of the present invention. FIG. 5B is an exploded diagram of the B portion of the frame 10 of the foldable stroller 100 shown in FIG. 1 according to the embodiment of the present invention. FIG. 6 is a diagram of a fixing base 15 according to the embodiment of the present invention. FIG. 7A is a diagram of the foldable stroller 100 with a seat 20 facing forwardly as the frame 10 is unfolded according to the embodiment of the present invention. FIG. 7B is a diagram of the foldable stroller 100 with the seat 20 facing forwardly as the frame 10 is folded according to the embodiment of the present invention. As shown in FIG. 5A to FIG. 7B, the foldable stroller 100 further includes the seat 20. The frame 10 further includes two fixing bases 15 for installing the seat 20, and two engaging assemblies 52. The two fixing bases 15 are installed at two joints of the carrier support 14 and the front foot 12, respectively. The two fixing bases 15 are rotatably installed on the front foot 12 by the two third pivoting shafts 23. Each of the two engaging assemblies 52 can lock rotation of the corresponding fixing base 15 relative to the front foot 12. Specifically, when the two fixing bases 15 are unfolded relative to the front foot 12, i.e., when a predetermined angle is formed between the two fixing bases 15 and the front foot 12 respectively, as shown in FIG. 7A, the two engaging assemblies 52 lock the rotation of the two fixing bases 15 relative to the front foot 12.

A positioning hole 521 is formed on each of the two fixing bases 15. Each of the two engaging assemblies 52 includes a fixing component 522 and a protruding block 523. The fixing component 522 is fixed on the front foot 12. The protruding block 523 is disposed on the fixing component 522. The two engaging assemblies 52 lock the rotation of the two fixing bases 15 relative to the front foot 12 when the two protruding blocks 523 engage with the two positioning holes 521. However, structure of the engaging assembly 52 is not limited to this embodiment. For example, in another embodiment, the protruding block 523 can be disposed on the fixing base 15, and the positioning hole 521 can be formed on the front foot 12. Furthermore, in another embodiment, the positioning hole 521, the fixing component 522, and the protruding block 523 of the aforementioned embodiment can be replaced with other engaging structures, and it depends on practical demands.

Specifically, the protruding block 523 can be a hemispherical block. As shown in FIG. 6, each of the two engaging assemblies 52 further includes an installing plate 53 disposed on a lower end of the corresponding fixing base 15 and an engaging platform 524. The positioning hole 521 is formed on the installing plate 53. The positioning hole 521 is composed of a first hole 5211 and a second hole 5212. The first hole 5211 is communicated with a lower edge of the installing plate 53 and has a diameter less than a diameter of the protruding block 523. The second hole 5212 extends from the first hole 5211 for engaging with the protruding block 523. The engaging platform 524 engages with the lower edge of the installing plate 53 when the protruding block 523 engages with the positioning hole 521.

More specifically, an installing hole 541 is formed on each of the two fixing components 522, and each of the two fixing components 522 includes an engaging block 542. Two fixing holes, not shown in figures, are formed on the front foot 12 and corresponding to the two engaging blocks 542. The two fixing components 522 are installed on the front foot 12 by the two installing holes 541, and the two engaging blocks 542 engage with the two fixing holes. An engaging hole 51 is formed on each of the two fixing bases 15. The seat 20 engages with the two fixing bases 15 by engagement of two engaging members of the seat 20 and the two engaging holes 51 of the two fixing bases 15 for installing the seat 20 on the frame 10. However, structures and operations of the fixing base 15 and the seat 20 are not limited to this embodiment, and it depends on practical demands.

Furthermore, the seat 20 can be installed on the frame 10 forwardly or rearwardly. As shown in FIG. 7A, the seat 20 is installed on the frame 10 forwardly, and the frame 10 is unfolded. The two protruding blocks 523 of the two engaging assemblies 52 engage with the two positioning holes 521, which locks the rotation of the two fixing bases 15 relative to the front foot 12. As shown in FIG. 7B, when it is desired to fold the foldable stroller 100 with the seat 20 facing forwardly, the pressing plate 41 is pressed to drive the abutting protrusions 42 to push the locking gear 33 to disengage from the internal gear 311 of the rotating disc 32. At this moment, the handle 11 is released to rotate toward the front foot 12 relative to the rear foot 13, and the rotating disc 32 is released to rotate relative to the circular locking disc 31 until the handle 11, the front foot 12, and the rear foot 13 are folded together. During the aforementioned process, the seat 20 can be fixed on the two engaging assemblies 52 and is not required to be detached from the fixing base 15 before folding the foldable stroller 100.

Figure 8A:
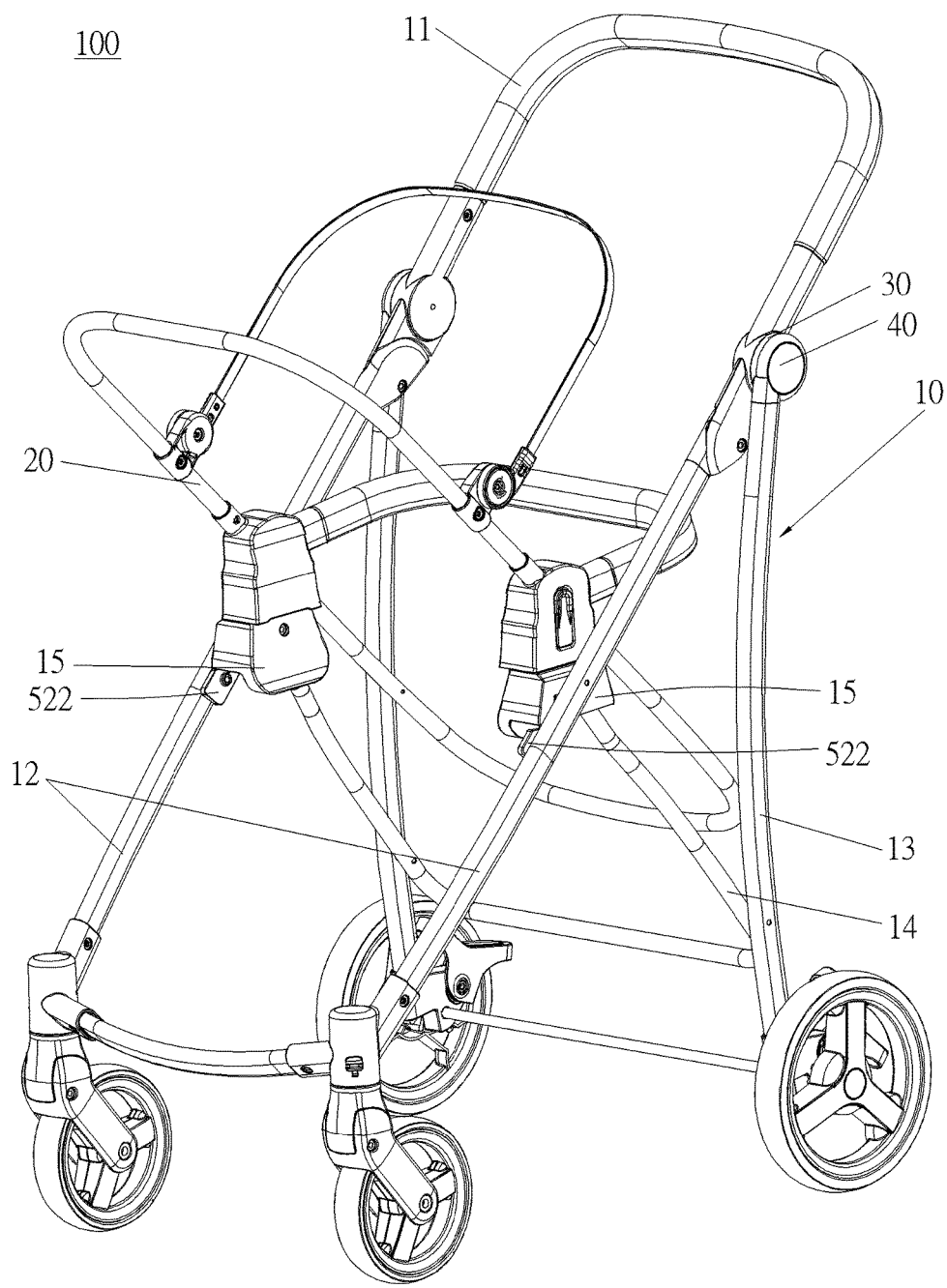
FIG. 8A is a diagram of the foldable stroller with the seat facing rearwardly as the frame is unfolded according to the embodiment of the present invention.
Figure 8B:
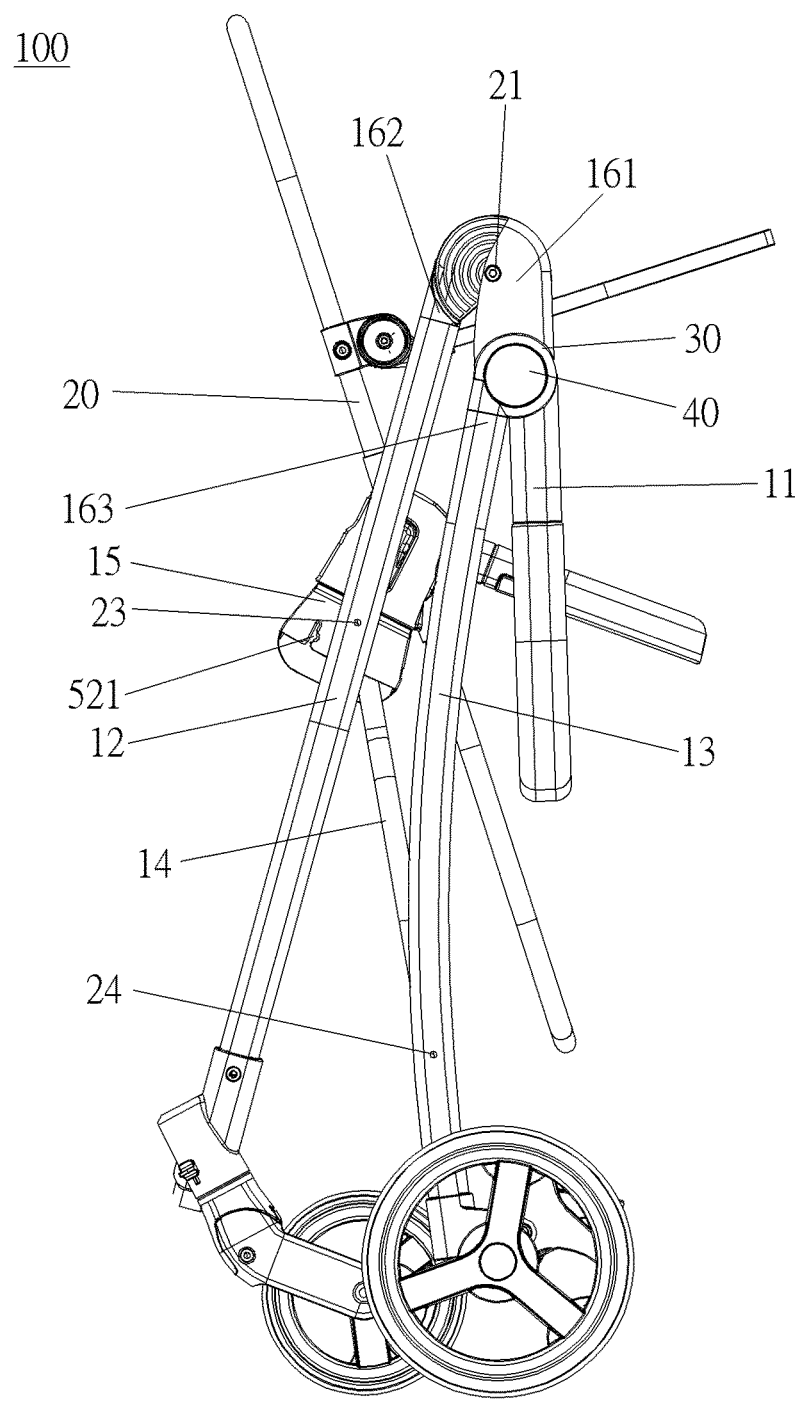
FIG. 8B is a diagram of the foldable stroller with the seat facing rearwardly as the frame is folded according to the embodiment of the present invention.

Please refer to FIG. 8A to FIG. 8B. FIG. 8A is a diagram of the foldable stroller 100 with the seat 20 facing rearwardly as the frame 10 is unfolded according to the embodiment of the present invention. FIG. 8B is a diagram of the foldable stroller 100 with the seat 20 facing rearwardly as the frame 10 is folded according to the embodiment of the present invention. As shown in FIG. 8A, the seat 20 is installed on the frame 10 rearwardly, and the frame 10 is unfolded. The two protruding blocks 523 of the two engaging assemblies 52 engage with the two positioning holes 521 for locking the rotation of the two fixing bases 15 relative to the front foot 12. As shown in FIG. 8B, when it is desired to fold the foldable stroller 100 with the seat 20 facing rearwardly, the pressing plate 41 is pressed to drive the abutting protrusions 42 to push the locking gear 33 to disengage from the internal gear 311 of the rotating disc 32, so that the handle 11 is released to rotate toward the front foot 12 relative to the rear foot 13, and the rotating disc 32 is released to rotate relative to the circular locking disc 31 until the handle 11, the front foot 12, and the rear foot 13 are folded together.

Furthermore, the two protruding blocks 523 of the two fixing components 522 can be operated to disengage from the two positioning holes 521 on the two fixing bases 15, so that the rotation of the two fixing bases 15 relative to the front foot 12 is released when folding the foldable stroller 100 with the seat 20 facing rearwardly. Therefore, the seat 20 can rotate to be folded around the two third pivoting shafts 23 in a clockwise direction with the frame 10 when folding the foldable stroller 100. During the aforementioned process, the seat 20 can be fixed on the two engaging assemblies 52 and is not required to be detached from the frame 10 before folding the foldable stroller 100. Besides, since the seat 20 can rotate around the two third pivoting shafts 23 in the clockwise direction when folding the foldable stroller 100 with the seat 20 facing rearwardly, it reduces an occupied space of the folded foldable stroller 100.

It should be noticed that in this embodiment, no matter when the seat 20 is installed on the frame 10 forwardly or rearwardly, the seat 20 is not required to be detached from the frame 10 for folding the foldable stroller 100 anymore, which is convenient in use.

Figure 9:
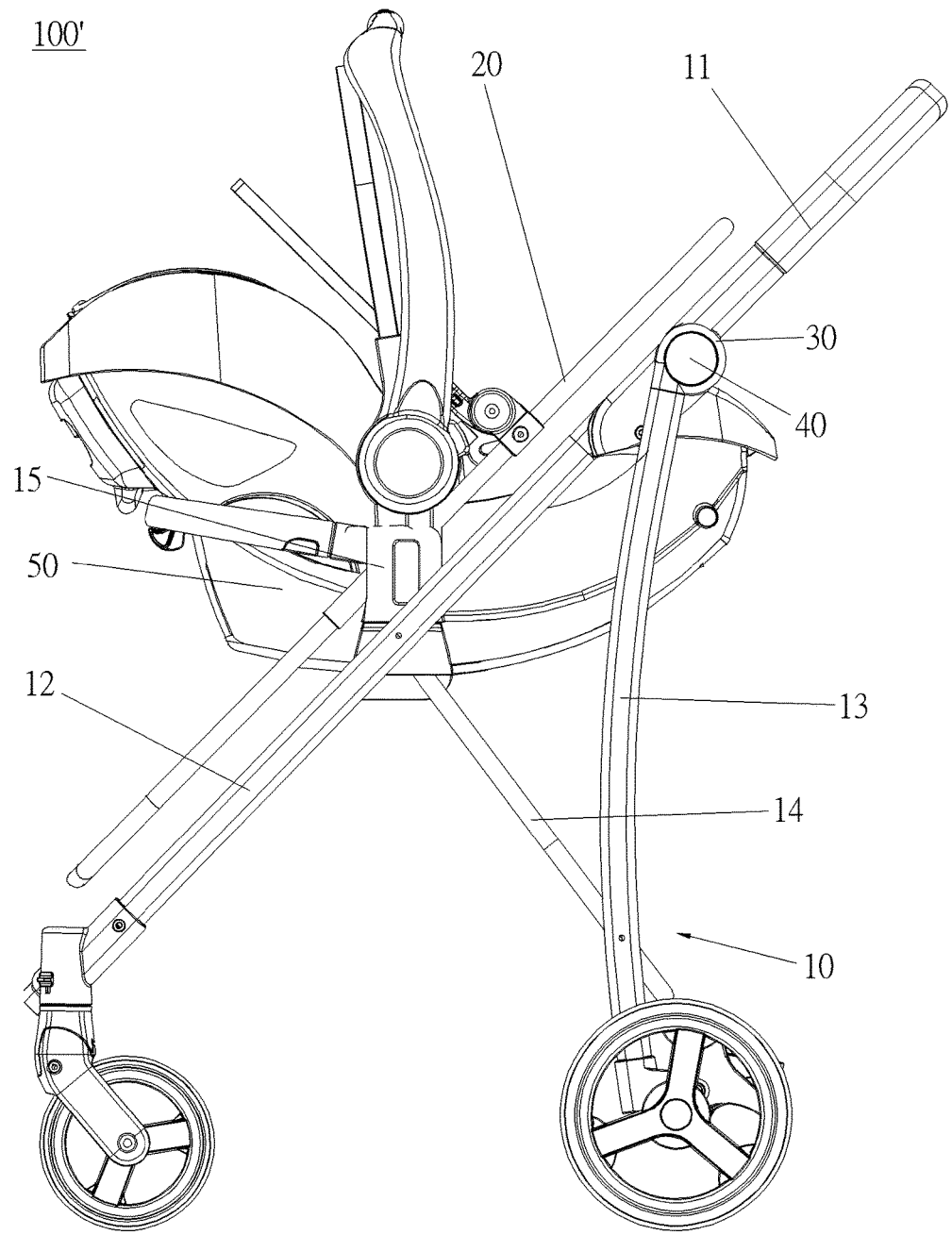
FIG. 9 and FIG. 10 are diagrams of a foldable stroller at two different operation conditions according to another embodiment of the present invention.
Figure 10:
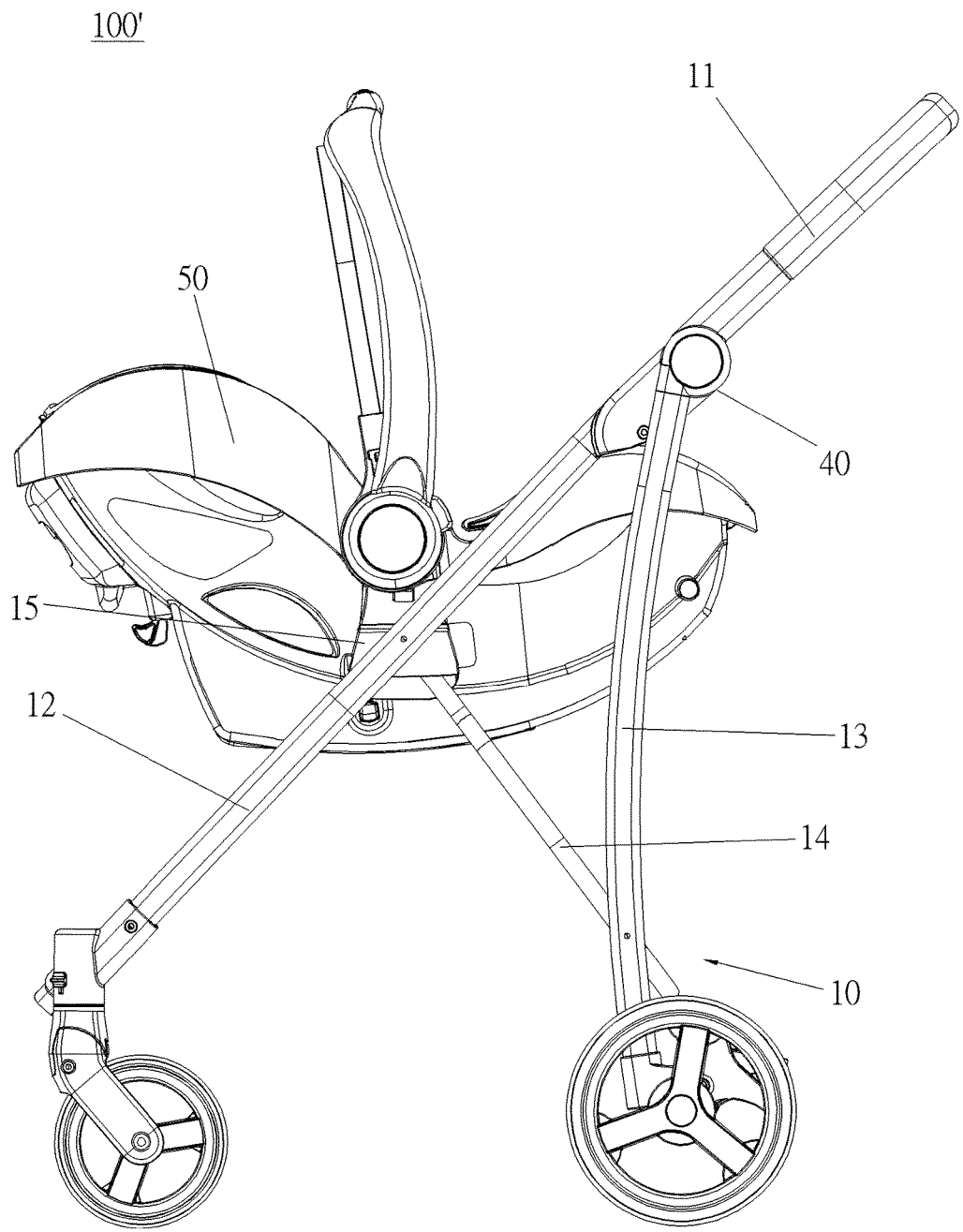

Please refer to FIG. 9 and FIG. 10. FIG. 9 and FIG. 10 are diagrams of a foldable stroller 100' at two different operation conditions according to another embodiment of the present invention. Different from the foldable stroller 100 of the aforementioned embodiment, the foldable stroller 100' further includes a car seat 50 installed on the frame 10. As shown in FIG. 9, the seat 20 is installed on the frame 10 rearwardly, and the car seat 50 is installed on the seat 20. As shown in FIG. 10, the seat 20 is detached from the frame 10, and the car seat 50 is installed on the frame 10 directly.

In contrast to the prior art, the present invention utilizes the front foot and the rear foot pivoted to the handle for allowing users to fold the front foot, the rear foot, the carrier support, and the handle together by rotating the handle toward the front foot. As a result, an overall length of the folded foldable stroller is approximately equal to a length of the front foot or the rear foot, which reduces an occupied space of the folded foldable stroller. Besides, the present invention further utilizes the locking component disposed between the handle and the rear foot for allowing users to release the rotation of the rear foot relative to the handle by operating the locking component, which is convenient in use. Moreover, since the rear foot is connected to the handle instead of the front foot, the rear foot supports the handle when the seat is installed on the unfolded frame. Therefore, the unfolded frame is effectively prevented from turning over, which is more reliable in operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A foldable stroller comprising:
  a frame comprising:
    a handle;
    a front foot, an upper end of the front foot being pivoted to the handle by two first pivoting shafts;
    a rear foot, an upper end of the rear foot being pivoted to the handle by two second pivoting shafts different from the two first pivoting shafts; and
    a carrier support comprising:
      at least one connecting rod, an end of the at least one connecting rod being pivoted to the front foot, and the other end of the at least one connecting rod being pivoted to the rear foot; and
  a locking component installed between the rear foot and the handle, the locking component locking rotation of the rear foot relative to the handle when the foldable stroller is unfolded.

2. The foldable stroller of claim 1, further comprising a seat, the frame further comprising a fixing base installed on the front foot, the seat being installed on the fixing base forwardly or rearwardly, and the seat is foldable along with the frame when the foldable stroller is folded.

3. The foldable stroller of claim 2, wherein the fixing base is rotatably installed on the front foot, the frame further comprises an engaging assembly for locking rotation of the fixing base relative to the front foot, and when the seat is installed on the fixing base rearwardly and the foldable stroller is folded, the engaging assembly is operated to release the fixing base and the front foot, so that the seat is rotatably folded along with the frame.

4. The foldable stroller of claim 3, wherein a positioning hole is formed on the fixing base, and the engaging assembly comprises:
  a fixing component fixed on the front foot; and
  a protruding block disposed on the fixing component;
  wherein the fixing base is not rotatable relative to the front foot when the protruding block engages with the positioning hole.

5. The foldable stroller of claim 4, wherein the engaging assembly further comprises an installing plate disposed on a lower end of the fixing base, the positioning hole is formed on the installing plate, and the protruding block is a hemispherical block.

6. The foldable stroller of claim 2, wherein the fixing base is installed at a joint of the carrier support and the front foot.

7. The foldable stroller of claim 1, wherein the handle comprises a handling portion and two installing rods connected to the handling portion and spaced from each other, the front foot comprises two front supporting rods corresponding to the two installing rods and space from each other, the rear foot comprises two rear supporting rods corresponding to the two installing rods and space from each other, an upper end of each of the two front supporting rods is pivoted to an end of the corresponding installing rod, and an upper end of each of the two rear supporting rods is pivoted to a middle portion of the corresponding installing rod.

8. The foldable stroller of claim 7, wherein the front foot further comprises a front linking rod connected between two lower ends of the two front supporting rods.

9. The foldable stroller of claim 7, wherein the carrier support comprises two connecting rods spaced from each other, the carrier support further comprises a middle linking rod connected between rear ends of the two connecting rods, a front end of each of the two connecting rods is pivoted to a middle portion of the corresponding front supporting rod, and the rear end of each of the two connecting rods is pivoted to a middle portion of the corresponding rear supporting rod.

10. The foldable stroller of claim 7, wherein two ends of the handling portion are connected to ends of the two installing rods respectively.

11. The foldable stroller of claim 1, wherein the locking component comprises:
  a circular locking disc disposed on the handle;
  a rotating disc disposed on the rear foot, the rotating disc being rotatably installed on the handle and opposite to the circular locking disc; and
  a locking gear installed between the circular locking disc and the rotating disc, each of the circular locking disc and the rotating disc having an internal gear corresponding to the locking gear, the locking gear engaging with both of the two internal gears of the circular locking disc and the rotating disc to lock the rotation of the rear foot relative to the handle, and the locking gear disengaging from the internal gear of the rotating disc to release the rotation of the rear foot relative to the handle.

12. The foldable stroller of claim 11, wherein the locking component further comprises a resilient member and an operating portion, the resilient member abuts between the circular locking disc and the locking gear, the operating portion is installed on an outer surface of the rotating disc, the operating portion comprises a plurality of abutting protrusions, a plurality of through holes are formed on the rotating disc for allowing the plurality of abutting protrusions to pass through, and the plurality of abutting protrusions push the locking gear to disengage from the internal gear of the rotating disc when the operating portion is pressed.

13. The foldable stroller of claim 11, wherein the locking gear comprises a plurality of teeth with different sizes or different space widths, and when the frame is unfolded, the plurality of teeth of the locking gear mate with a plurality of teeth of the internal gear of the rotating disc, so that the locking gear is movable between the circular locking disc and the rotating disc.

14. The foldable stroller of claim 1, further comprising:
two front wheels installed on a lower end of the front foot; and
two rear wheels installed on a lower end of the rear foot.

* * * * *